United States Patent [19]

Moxness

[11] 3,819,130

[45] June 25, 1974

[54] FOUR-REEL MAGNETIC TAPE CARTRIDGE

[75] Inventor: James G. Moxness, N. St. Paul, Minn.

[73] Assignee: Minnesota Mining and Manufacturing Company, St. Paul, Minn.

[22] Filed: Oct. 24, 1972

[21] Appl. No.: 300,204

[52] U.S. Cl. ........................................ 242/199

[51] Int. Cl.... G03b 1/04, G11b 15/32, G11b 23/04

[58] Field of Search .... 179/100.2 Z; 274/4 C, 11 C; 352/72–78; 242/197–200, 180

[56] References Cited

FOREIGN PATENTS OR APPLICATIONS 849,958 12/1939 France ........................ 242/67.4

*Primary Examiner*—Leonard D. Christian

*Attorney, Agent, or Firm*—Alexander, Sell, Steldt & DeLaHunt

[57] ABSTRACT

A magnetic tape cartridge in which two pairs of coaxial reels are rotatable about spaced parallel axes, each reel being aligned in planes perpendicular to said axes with one reel in the other reel pair. The reels in one coaxial pair are independently rotatable while the reels of the other pair are rotatable together. And, a first length of magnetic tape extends between two of the aligned reels and is convolutely wound about their axes in the same direction while a second length of magnetic tape extends between the other two aligned reels and is convolutely wound about their axes in opposite direction, the lengths of tape being wound on the independently rotatable reel pair in the same direction about their common axis.

3 Claims, 3 Drawing Figures

FOUR-REEL MAGNETIC TAPE CARTRIDGE

FIELD OF THE INVENTION

The present invention relates to a magnetic tape cartridge having four reels for supplying magnetic tape to a recording and/or reproducing machine.

BACKGROUND OF THE INVENTION

The prior art is replete with magnetic tape cartridges for supplying magnetic tape to a recording and/or reproducing apparatus without the necessity of the operator handling the tape. To increase the recording time available with a single cartridge, multiple recording tracks across the width of the tape have been utilized. And, the length of the magnetic tape has been extended in some instances to further extend the recording time. A cartridge utilizing both of these techniques is disclosed in U.S. Pat. No. 3,570,780 wherein the length of magnetic tape extends along a tape path between a pair of coaxial reels which tape path extends across an opening for a magnetic transducer in two parallel passes. However, that type of tape cartridge suffers from two drawbacks; first, the tape path between coaxial reels must be tortuous thereby leading to excessive wear on the edges of the tape unless costly precautions are taken; and second, at any one time there is essentially only immediate access to one point on a very long length of tape.

SUMMARY OF THE INVENTION

The magnetic tape cartridge of the present invention is constructed for use in a tape recording and/or reproducing machine having a single reel driving spindle for driving a pair of reels through independent slip clutches. It includes a cartridge shell defining an enclosure within which a first pair of reels is supported coaxially for independent rotation about their common axis and for driving from the reel driving spindle and a second pair of reels is supported coaxially for rotation together about their common axis; the axis of the second pair of reels being spaced from and parallel to the axis of the first pair of reels, and each reel being aligned in planes perpendicular to the reel axes with one reel in the other reel pair. A first length of magnetic tape extends along a first tape path between two aligned reels and is convolutely wound on the reels in the same direction about their axes and a second length of magnetic tape extends along a second tape path between the other two aligned reels and is convolutely wound on the reels in the opposite direction about their axes; the lengths of tape also being wound on the first pair of reels in the same direction about their common axis. An extended tape cartridge is thus provided utilizing two lengths of magnetic tape which extend along straight paths between their respective reels and which effectively permits immediate access to two different portions of the total length of recording media.

DESCRIPTION OF THE PREFERRED EMBODIMENT

Figure 1:
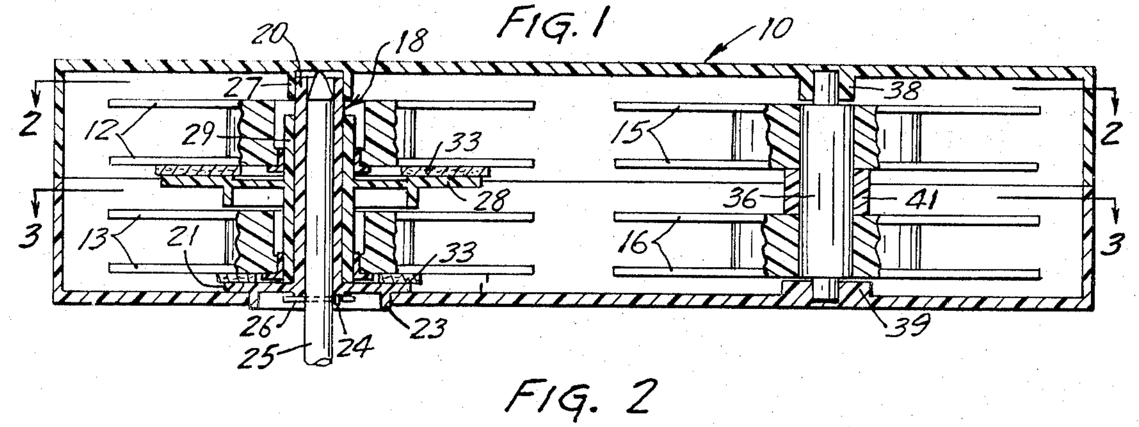
FIG. 1 is a vertical sectional view of a magnetic tape cartridge constructed in accordance with the present invention.

The cartridge includes a shell 10 defining an enclosure, which shell is a molded polymeric material formed in upper and lower halves secured together by suitable threaded fasteners. Two pairs of reels 12, 13 and 15, 16 are supported for rotation within the enclosure of the cartridge shell 10. The reels in each reel pair 12, 13 and 15, 16 are coaxial and the axes of the two reel pairs are spaced and parallel with each reel being aligned in planes perpendicular to the reel axes with one reel in the other reel pair; the upper reel 12 in the first reel pair 12, 13 being aligned with the upper reel 15 in the second reel pair 15, 16 and the lower reel 13 in the first reel pair 12, 13 being aligned with the lower reel 16 in the second reel pair 15, 16.

The first pair of reels 12 and 13 are supported for independent rotation by a rotatable drive and support shaft 18. The shaft 18 is formed by a first sleeve 20 having a lower clutch disk 21 formed integrally therewith. One end of the sleeve 20 is fitted in an excess opening 23 formed in the bottom wall of the cartridge shell 10. This end of the sleeve 20 is provided with axially extending diametrically positioned tabs 24 affording means for a positive drive coupling with a cross pin 26 through a reel driving spindle 25 on a recording and/or reproducing apparatus. The opposite end of the sleeve 20 is supported within a cup-like projection 27 extending downward from the upper wall of the cartridge shell 10.

An upper clutch disk 28, formed integrally with a second sleeve 29, fits over sleeve 20, is concentric therewith, and is keyed or suitably connected to the lower clutch disk 21 and sleeve 20 such as by a projection fitting in an opening of the lower disk 21 to be rotated therewith. The second sleeve 29 fits within the center bores of the reels 12 and 13 and the upper clutch disk 28 is positioned between the two reels. Thus, the reels 12 and 13 are resting on clutch disks 21 and 28, respectively, and are rotatable relative to sleeve 29 and to each other. Adhesively secured on the outer surface of the lower flange of each of the reels 12 and 13 and in opposed contacting relation to the clutch disks 21 and 28 are friction pads or disks 33 which are formed of a suitable material to cooperate with the material forming the clutch disks such that the torque transmitted to a reel 12 or 13 is, or is substantially, directly proportional to the weight of the tape on the reel plus the weight of the reel. Additionally, the slip clutches must afford a proper amount of tension in the tape to provide proper contact with a magnetic transducer. Suitable material for the friction pads 33 and the clutch disks 21 and 28 are suede or felt and a polymeric material, e.g. acetal resin, respectively. Rotation of the sleeve 20 rotates the clutch disks 21 and 28 imparting driving torque to the reels 12 and 13 through the slip clutch disks 21 and 28, respectively, and the friction pads 33.

The second pair of reels 15 and 16 are press fit on a shaft 36 for rotation together therewith. The ends of the shaft 36 are formed with reduced diameter portions which are bearinged in cup-like projections 38 and 39 in the upper and lower walls, respectively, of the cartridge shell 10. A collar 41 fit on the shaft 36 between the reels 15 and 16 defines the proper spacing between the reels for alignment of the reels in the second reel pair 15, 16 with those of the first reel pair 12, 13.

A first length of magnetic tape 43 extends along a tape path between the upper aligned reels 12 and 15 and is convolutely wound on the reels in the same direction about their axes. The first tape path extends from reel 12 around a corner guide roller 45, along the front edge of the cartridge shell 10, around a second corner guide roller 46 and onto the reel 15.

A second length of magnetic tape 48 extends along a tape guide path between the lower aligned reels 13 and 16 and is convolutely wound on the reels in opposite directions about their axes. The second tape 48 is wound on reel 13 in the same direction as the first tape 43 is wound on the coaxial reel 12 and, thus, it is wound on reel 16 in the opposite direction that the first tape 43 is wound on the coaxial reel 15. The second tape guide path extends from reel 13 around a third guide roller 50 that is coaxial with the first guide roller 45, along the front edge of the cartridge shell 10, around a fourth guide roller 51 that is coaxial with the second guide roller and onto the reel 16. The coaxial relationship of the guide rollers 45 and 50 and guide rollers 46 and 51 causes the tape paths along the front edge of the cartridge shell 10 to be normally coplanar.

The cartridge shell 10 is formed with an opening 53 in its base wall for access by a capstan shaft to the inside surface of both lengths of magnetic tape 43 and 48 and the front wall of the cartridge shell 10 is formed with an opening 56 for access by a pair of pressure rollers 58 and 59 to the upper length of tape 43 and the lower length of tape 48, respectively. The front wall of the cartridge shell 10 is also formed with an opening 61 for access by a pair of magnetic transducers 63 and 64 to the upper and lower magnetic tapes 43 and 48, respectively.

Figure 2:
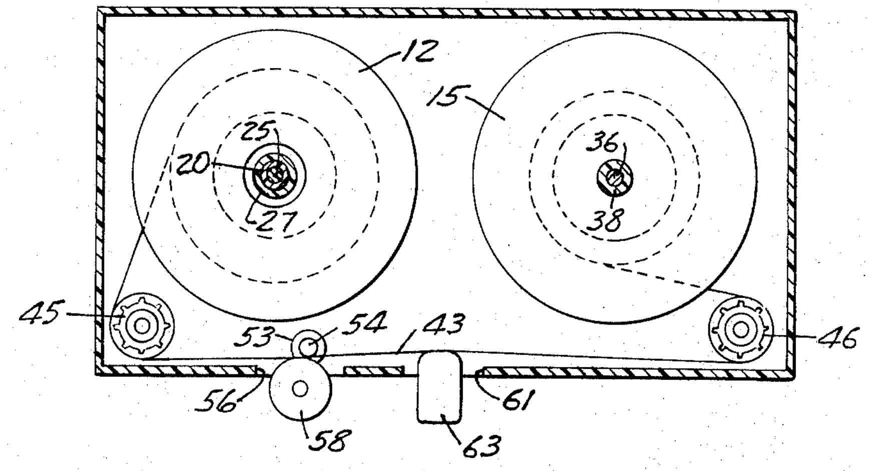
FIG. 2 is a cross-sectional view taken generally along line 2—2 of FIG. 1.
Figure 3:
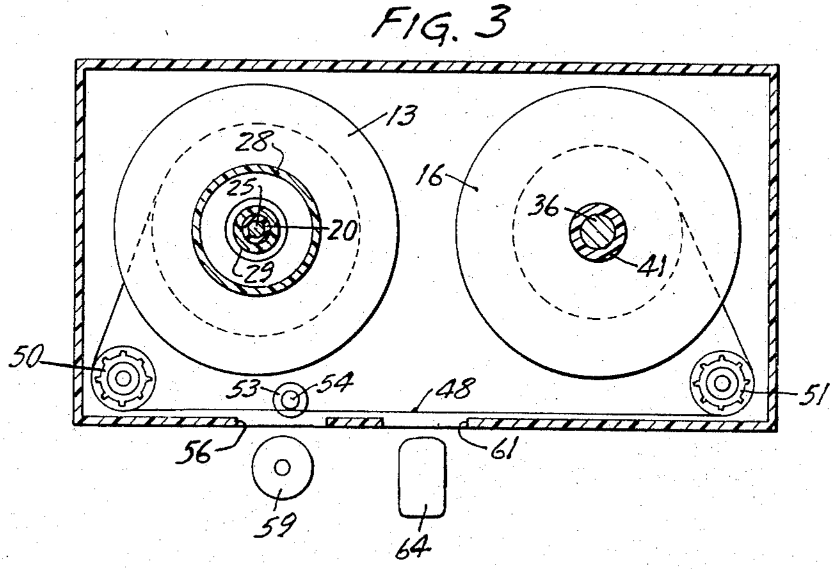
FIG. 3 is a cross-sectional view taken generally along line 3—3 of FIG. 1.

In use, the cartridge is inserted into the recording and/or reproducing machine vertically downward to cause the insertion of the reel driving spindle 25 into the sleeve 20 through the access opening 23 and the capstan shaft 54 into the opening 53 in the base wall of the cartridge shell 10. The recording apparatus is then activated to rotate the reel driving spindle 25 from the drive motor continuously in a clockwise direction as viewed in FIG. 2 and to continuously rotate the capstan shaft 54 also in a clockwise direction as viewed in FIG. 2.

A pressure roller 58 and the associated magnetic transducer 63 are then moved into the cartridge to engage the magnetic tape 43 against the capstan shaft 54 and to engage the transducer 63 with the tape for recording and/or reproducing. The capstan shaft 54 and pressure roller 58 provide the force for moving the tape 43 along its tape path from the right reel 15 to the left reel 12 while the reel driving spindle 25 through the slip clutches 21 and 28 and the friction pads 33 drives the first reel pair 12, 13 to place tension in both lengths of tape. The tension results from the fact that the reel driving spindle 25 continuously seeks to wind tape on both reels in the first reel pair 12, 13 which cannot be accomplished because the reels of the second reel pair 15, 16 must rotate if at all in the same direction about their common axis and if tape were to be unwound from them simultaneously it would be necessary for them to be rotated in opposite directions because of the direction of tape winding about their common axis. Thus, driving of the upper or first length of tape 43 from the reel 15 onto the reel 12 permits recording and/or reproducing of magnetic signals on that length of tape. At the same time, the lower or second length of tape 48 is caused to be wound from the reel 13 onto the reel 16 by the rotation of the reel 16 with the coaxial reel 15 against the tension caused by the reel driving spindle 25 through the friction clutch 21 and the friction pad 33.

Likewise, engagement of the lower pressure roller 59 and the associated magnetic transducer 64 with the lower or second length of magnetic tape 48 transfers the tape from the right reel 16 onto the left reel 13 for recording and/or reproducing on the second length of tape 48 while the first length of tape 43 is being transferred from the left reel 12 onto the right reel 15.

I claim:

1. A magnetic tape cartridge for use in a tape recording and/or reproducing machine having a single reel driving spindle for driving a pair of reels through independent slip clutches, comprising:
- a cartridge shell defining an enclosure,
- a first pair of reels supported coaxially within said enclosure for independent rotation about their common axis and for driving from a said reel driving spindle,
- a second pair of reels supported coaxially within said enclosure for rotation together about their common axis, the axis of said second pair of reels being spaced from and parallel to the axis of said first pair of reels, and each reel being aligned in planes perpendicular to said axes with one reel in the other reel pair,
- a first length of magnetic tape extending along a first tape path between two aligned reels and being convolutely wound on said reels in the same direction about their axes, and
- a second length of magnetic tape extending along a second tape path between the other two aligned reels and being convolutely wound on said reels in the opposite direction about their axes, said second length of tape being wound on the reel in said first reel pair in the same direction as said first length of tape is wound on the other reel in said first reel pair.

2. The tape cartridge of claim 1 wherein said tape paths are coplanar along one edge of said enclosure.

3. The tape cartridge of claim 1 wherein said first pair of reels are supported on a rotatable shaft formed at one end and supported by said cartridge shell to afford a drive coupling with a said reel driving spindle, said rotatable shaft having a pair of clutch disks affixed thereto in spaced parallel relation, each clutch disk supporting one reel with a flange of each of said reels frictionally engaging the associated clutch disk when said one end of said shaft is connected to a said spindle.

* * * * *